Figures 1, 2:
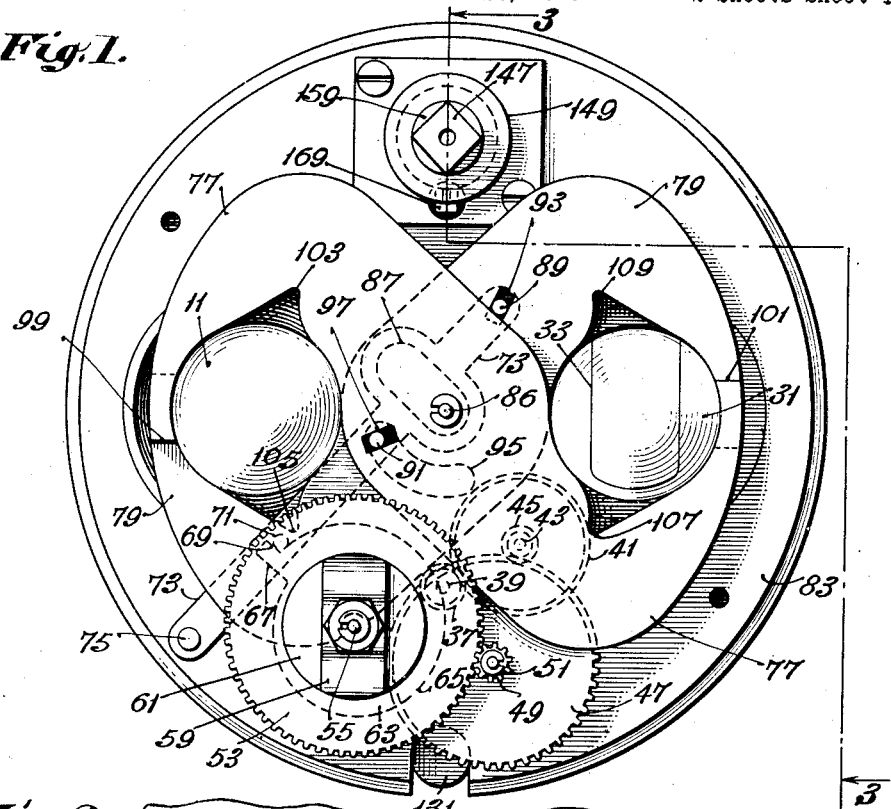

June 3, 1947.  E. C. GUEDON  2,421,499
SHUTTER FOR CONTROLLING LIGHT ALONG TWO INDEPENDENT OPTICAL PATHS
Filed Nov. 22, 1943  2 Sheets-Sheet 1

INVENTOR
Emile C. Guedon
by H. S. Grover,
ATTORNEY.

June 3, 1947. E. C. GUEDON 2,421,499
SHUTTER FOR CONTROLLING LIGHT ALONG TWO INDEPENDENT OPTICAL PATHS
Filed Nov. 22, 1943 2 Sheets-Sheet 2
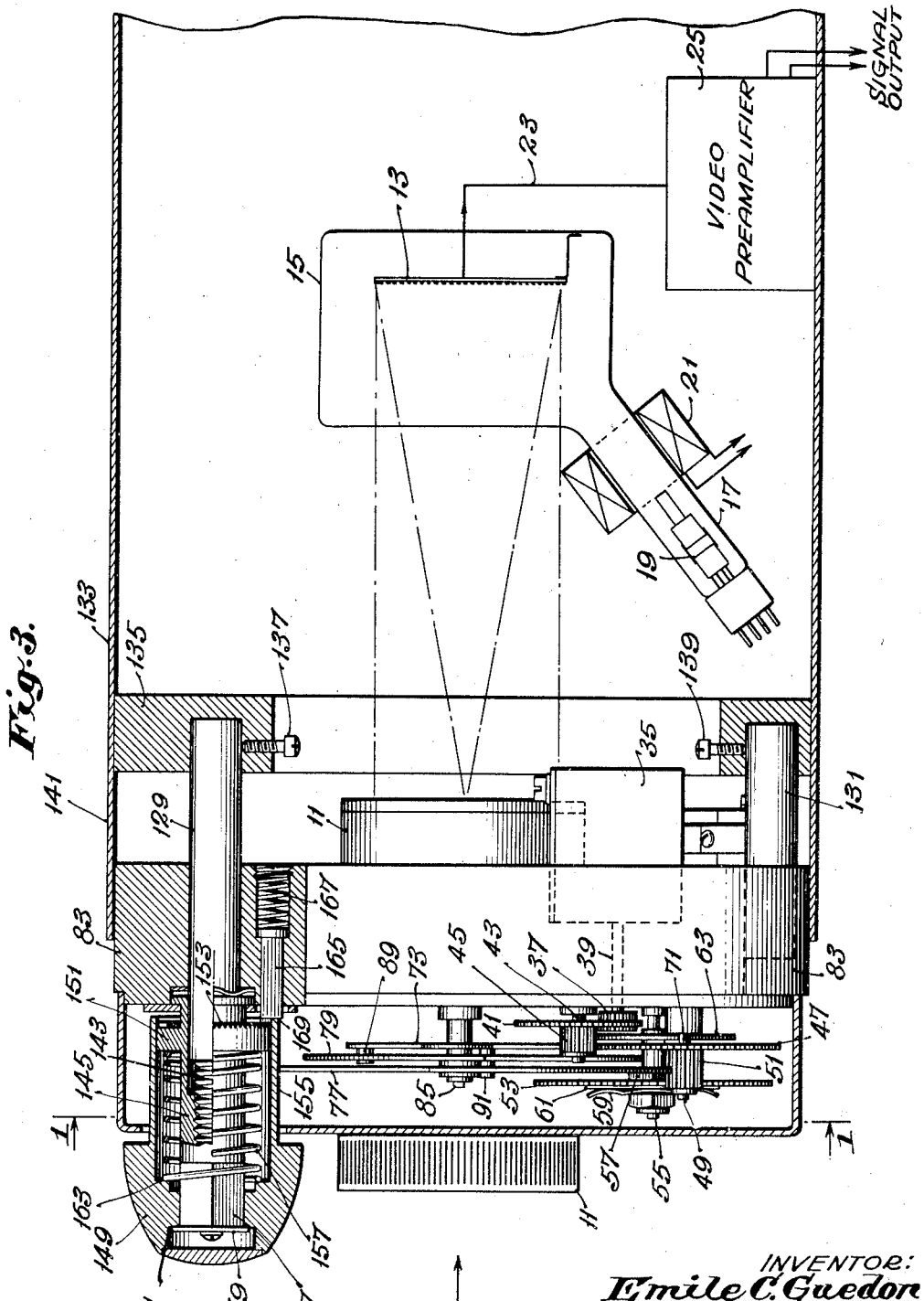
INVENTOR:
Emile C. Guedon
by H. S. Snover.
ATTORNEY.

Patented June 3, 1947

2,421,499

UNITED STATES PATENT OFFICE 2,421,499

SHUTTER FOR CONTROLLING LIGHT ALONG TWO INDEPENDENT OPTICAL PATHS

Emile C. Guedon, Audubon, N. J., assignor to Radio Corporation of America, a corporation of Delaware Application November 22, 1943, Serial No. 511,369

4 Claims. (Cl. 95—64)

This invention relates to an apparatus and means for controlling and regulating the amount of light which is permitted to enter an optical system of any suitable character so as to influence any and all desired types of light responsive apparatus.

It frequently becomes important, in either television or motion picture operation, to control rapidly and automatically the light which passes through a suitable focusing or condensing lens system onto the light sensitive camera tube of the television transmission system, or which is permitted to influence the light sensitive photographic film of a motion picture device.

To this end, the present invention provides a light control apparatus in which an iris element, including a plurality of actuated vanes or shutter elements, is arranged to be open and closed, thereby to regulate the light quantity which can pass through an optical system. The invention is related to and operates in accordance with the principles explained in the copending application for U. S. Letters Patent, Serial No. 491,344, which this applicant filed on June 18, 1943, jointly with Herbert Belar.

In the companion application above named, provision was made for an automatic control to regulate the light falling upon a television scanning or camera tube or a motion picture film, and in the aforesaid companion application provision was also made for electrical controls whereby a motor was operated in accordance with the instantaneous brilliance of light, so that when the motor was running either clockwise or counterclockwise there would be a control of an iris or shutter element which would open or close so as to reveal more or less light to the optical system.

The present invention is intended to operate with a motor control of the aforesaid character, but is primarily concerned with a mechanism whereby the opening or closing of the shutter elements relative to the optical system is provided, in contrast to the operation of the motor control per se, as set forth in the said companion application.

It was explained, in the above mentioned companion application, that it becomes important in any work on light sensitive apparatus to have means provided whereby the functioning apparatus may be protected from conditions of extreme light brilliance by virtue of the closure of shutter elements or the like over the optical system so as thereby to reduce the light entering into and controlling the operation or functioning of the light responsive apparatus. At the same time, with conditions of reduced brilliance, it becomes equally important to provide arrangements whereby a greater quantity of light may be permitted to fall through or enter into the optical system, so that substantial uniformity of response from the controlled apparatus is obtained, regardless of the actual light brilliance, with the compensation being made by way of the control of the entering light.

Accordingly, the present invention is predicated upon the use of an assembly which includes a support base or element arranged in conjunction with two shutters or vanes which are operated under the control of a motor through a suitable speed reducing mechanism. With these shutter vanes there is provided a suitable clutch and switch assembly arrangement to control the operation at the extremities of motion and, in combination with these elements, suitable switching arrangements for controlling the direction of motor rotation for control purposes after extreme positions of shutter means have been provided, will be found to be in operation.

Further, the present invention incorporates suitable instrumentalities whereby the unit as a whole may be adjusted relative to the light sensitive apparatus with which it is to be used, so that the light of an image which is passed through the optical system may be accurately focused upon the light sensitive apparatus itself.

It accordingly becomes an object of this invention to provide a system and means to control the light entering into and passing through an optical system from which it is arranged to influence suitable light sensitive apparatus.

Another object of this invention is to provide a shutter control mechanism whereby not only the light entering into the optical system to affect the light responsive apparatus may be controlled, but simultaneously there is provided an independent and co-operating control which limits the quantity of light which determines the direction of motor rotation to drive the shutter elements.

Other objects and advantages of the invention will become apparent and naturally suggest themselves to those skilled in the art to which the invention is directed when the following specifications are read in connection with the accompanying drawings, wherein, Fig. 1 illustrates one general arrangement of the shutter elements with the cover unit removed which, for example, might be a view looking in the direction of the arrows 1—1 of Fig. 3;

Fig. 2 represents a plan view of the controlled apparatus looking from the rear of Fig. 1 and shows primarily the motor control switch and the control lever drive; and, Fig. 3 represents a partially sectional view looking in the direction of the arrows of Fig. 1 with the control unit shown as supported upon and attached to a housing instrumentality wherein is contained a suitable light responsive assembly.

It was explained, in the co-pending application Serial No. 491,344, above mentioned, that the apparatus itself was controlled in accordance with the intensity of light reaching a photo-sensitive element. To this end the apparatus herein to be described incorporates generally two lens elements and two shutter elements which are arranged to control the light passing into a suitable camera, and also to a light responsive control unit. In the arrangement shown, it will be assumed that light may enter through a lens element 11 from the direction shown by the arrow in Fig. 3, so as to pass through the system and to fall upon the light sensitive target or mosaic plate of a television camera tube, for instance, which is conventionally represented at 15. It is, of course, to be appreciated that the television camera tube shown may be of any and all types, and may be either of the storage or non-storage variety, or the light sensitive apparatus, which is conventionally represented at 15 may, as above noted, consist of a suitable motion picture camera element with a light sensitive film replacing the light sensitive mosaic or target element 13.

If it be assumed, for illustrative purposes, that the light control element is used with a television camera tube of the type shown by the tube 15 (which may be the well known "Iconoscope"), there is developed within the neck 17 of the tube, by means of an electron gun assembly conventionally represented at 19, an electron beam (not shown) which is directed from the gun 19 toward the target 13. This electron beam is suitably deflected in two mutually perpendicular directions by the conventionally represented deflecting coils 21.

It is known, according to television practice and from familiarity with the general type of scanning tube referred to, that a light image passing through the optical system or focusing lens 11 to the mosaic element 13 produces thereon a series of electrostatic charges which are often considered an electrical image of the subject. These charges are removed by the scanning cathode ray beam and when so removed may be, for illustrative purposes, considered as being supplied by way of the conductor 23 by any suitable form of video signal amplifier, such as that conventionally represented at 25, which amplifier, per se, forms no specific part of this invention. Likewise, light of substantially the same brilliance as that passing through the optical system or lens element 11 to the camera tube 13 is arranged also to pass through the second optical system or lens element 31 and thereby to influence a phototube 33 in the manner explained in the above mentioned co-pending application.

In accordance with the output energy flowing from the phototube 33, a control is developed and serves as the controlled energy provided for a driving motor, conventionally represented at 35, so that a suitable drive pinion 37, mounted upon the motor shaft 39, may be rotated in either a clockwise or counter-clockwise direction in accordance with the direction of rotation selected for the motor. It is not important to this invention that the motor 35 be of any particular type, although it has been found, in connection with an arrangement of this type, to be convenient to use a small motor of generally the permanent field type which is provided by way of a permanent magnet support. The system for supplying the driving energy to the motor 35 and the control for the motor were each explained in the mentioned co-pending application and do not specifically enter into this disclosure except as necessary to an understanding that the direction of motor rotation and the extent of rotation are determined by the light reaching the phototube 33 through its associated lens 31.

When the motor 35 drives the pinion 37 carried upon the motor shaft 39, it will be seen that the next driven gear of the gear train is a pinion 41 which is carried upon a shaft or spindle 43, to which is also attached a further pinion 45. The pinion 45 then drives a gear element 47 which is carried upon a shaft 49, to which is also attached a further pinion element 51. The pinion 51 then drives the gear 53 which is supported upon the shaft 55 which carries a clutch element of the spring variety, later to be described herein.

As particularly indicated by Fig. 3, the gear 53 carried upon the shaft or spindle 55 rests upon a suitable support 57 and, by means of the spring member 59, is pressed closely adjacent the disc 61. Normally, when the motor 35 is driving the gear train, the spring clutch element comprising the disc 61 and the spring member 59 is adequate to drive the shaft or spindle 55 in accordance with the rotation of the gear 53, in view of the fact that the spring member 59 is fixedly attached thereto, but when the limit of motion of rotation of the shaft or spindle 55 has been reached, so that the shutter elements, later to be described, are either fully open or fully closed, it will be appreciated that slip can occur between the driving disc element 61 which is attached to the gear 53 and the spring element 59, so that irrespective of the rotation of the motor 35, no further rotational movement will be transferred from the driving gear train to the driven spindle or shaft 55.

Attached to the shaft or spindle 55 is a cam element 63 having a cam surface, represented at 65, which terminates at the end of the cam track of minimum radius in an abutment or stop 67, and at the end of maximum cam radius in an abutment or stop 69, which abutments are adapted to contact a stop member or pin 71 attached to a control lever element 73 which is arranged to move about a pivot point 75. The lever element 73, in its motion, is for the purpose of controlling the opening and closing of two shutter elements 77 and 79, as will later be described.

So that the lever arm 73 may be held or positioned in such a way that the pin 71 is always in contact with the cam face 65 of the cam element 63, a spring 81 is attached to the frame element 83 at one end, and to an insulating finger element 85 at its other end, with the insulating finger element being attached, as shown by Fig. 2, and fixedly secured upon the shaft or spindle 75. Thus, by virtue of the spring element 81, the pin 71 is continuously held against the cam surface 65 and the lever arm, as shown by Fig. 1 particularly, will tend to rotate in a clockwise direction by virtue of the spring pull when the cam 63 rotates counter-clockwise so as to bring the abutting edge 67 of the cam into engagement with the stop pin 71, in contrast to the abutting edge 69, as represented by Fig. 1.

Under such circumstances it will be appreciated that with the vanes or shutter elements 77 and 79 of the iris being positioned for oscillation or rotation about the pivot or support point 86, movement of the lever arm 73 due to rotation of the cam 63 will cause the shutter elements 77 and 79 to rotate about the rotation center 86, provided the motion imparted to the lever arm 73 can be translated into a motion of the shutter elements. For this purpose the lever arm 73 is provided in slot-like formation in the region 87, so that the support shaft or spindle about which the shutter elements 77 and 79 turn may be positioned in such a way as to be surrounded by the lever arm while yet leaving the lever arm completely free to oscillate without interfering with the motion of the shutter vanes 77 and 79.

These shutter elements 77 and 79 are, as will be apparent from the showing of Fig. 3 particularly, so positioned that they are held one above the other, and each is capable of rotating both clockwise and counter-clockwise about the pivot point or shaft 86, depending upon which direction of motion is imparted thereto, by reason of the tendency of the control lever 73 to rotate.

To provide the desired rotation of the shutter and to bring the separate shutter vanes either to an open or to a closed position relative to the lens elements 11 and 31, drive pins 89 and 91 are attached substantially at the end of the lever and at an intermediate point respectively. The drive pin 89 fits through a slot 93 upon the more inwardly positioned shutter 79, so that if the lever 73 tends to rotate in a clockwise direction, it will tend also to rotate the shutter vane 79 clockwise, so that the shutter 79 rotates about the pivot point or shaft 86. In this way, looking at Fig. 1 for instance, the upper portion of the shutter vane or element 79 will tend to move downwardly over the lens 31, while the other half of the shutter vane 79 will tend to move upwardly so as to cover the lens 11. Similarly, the pin 91, positioned on the lever 73 at an intermediate point of the pivot point 75 and the end, is arranged to pass through an arcuate slot 95 which is cut into the lower shutter 79 in order that motion of the pin 91 shall have no effect upon the control of the position of the shutter 79. However, the pin 91, when it protrudes through the slot 95 in the shutter 79, will pass through to a second slot 97 in the shutter vane 77 which is similar to the slot 93 in the shutter vane 79. Thus, as the lever 73 rotates in a clockwise direction, for instance, to close the shutter vane 79 over the lenses 31 and 11 by clockwise rotation of the said shutter vane, the pin 91 will drive the shutter vane 77 through its motion in the slot 97 in such a way as to provide for a counter-clockwise rotation of the shutter vane 77. In this way, the upper or lefthand half of the shutter vane 77 will, with the clockwise rotation of the lever arm 73, tend to close over the lens cement 11 while it moves downwardly and counter-clockwise, and similarly closes over the lens 31 while it moves upwardly and counter-clockwise. With the two shutter vanes 77 and 79 being positioned in spaced relationship with respect to each other (see particularly Fig. 3), the edges 99 and 101 will, upon closing, move over the shutter vane 79 until, for substantially complete closure, the point 103 of the shutter vane 77 will substantially meet the point 105 of the shutter vane 79 and, likewise, the point 107 of the shutter vane 77 will substantially meet the point 109 of the shutter vane 79. During such conditions it is clear that the light entering the lenses 11 and 31 will be reduced substantially to a minimum value.

When the opening and closing of the shutter elements or vanes 77 and 79 is being carried forward and the vanes are brought to a condition whereupon light entering the lenses 11 and 31 is either a maximum or a minimum (for instance, actually some light may enter or the light may be substantially completely cut off), it can be appreciated that the motor 35 drives through the gear train to move the lever arm 73 about a pivot 75, with the lever arm and the drive pin 71 thereof being held tightly against the cam track 65 by the spring 81, all as above explained. However, where a limited motion of the shutter elements has been accomplished, it is apparent that damage to the shutter elements might be incurred, unless provision is made for slippage at extreme points of motion. To this end, it will be seen that when the pin 71 rests against the abutment or end 69 of the cam track 65, or against the edge 67 of the same cam, the drive clutch provided by the disc 61 and the spring element 59 will permit slip to occur, due to the frictional nature of the drive, and, accordingly, irrespective of whether or not the motor 35 rotates, no driving effect can be transferred either to open or to close the shutter vanes 77 and 79 relative to the lens elements.

In the co-pending application referred to above, it was pointed out that the direction of motor rotation was controlled in accordance with the amount of light entering into and influencing the output current flowing from the phototube 33. When this condition occurs, the motor rotates in one direction for minimum or reduced output, and in the opposite direction for an increased or maximum output. It was also pointed out in the co-pending application that when the motor has turned a predetermined angular distance or a predetermined number of rotations, a make and break contact switch is opened or closed. To accomplish this result the insulating finger element 85 is rotated about the shaft 75 along with the lever arm 73 and against the tension of the spring element 81. As the insulating finger element 85 is rotated clockwise, for example, it finally causes the contact between the contact points 113 and 115 to be broken by virtue of the cam surface 117 of the insulating finger element bearing upon the switch arm 119 to force it to draw the contact points 113 and 115 apart from each other. Accordingly, where the motor 35 derives its energizing voltage from a source (not shown) which is connected through the contact elements to the motor field winding, for example, the rotation of the motor in one of its two directions will be arrested when the contact is broken, which naturally will be in substantially an extreme position of the shutter elements relative to the lens. Accordingly, if it be assumed, for instance, that the separation of the contacts 121 and 123 occurs when the shutter vanes are substantially closed, then it is apparent that the only change which can occur would be one which is due to a reduction in the light reaching the phototube 33 which would cause the motor then to rotate in the opposite direction so that the light entering through the lens element 11 to influence the light sensitive mosaic element 13 of the scanning tube 15 will be increased.

As the motor approaches an extreme or limiting condition in the direction of rotation for opening the vanes, due to its being energized through the contacts 113 and 115, it is apparent that the insulating finger element 85 will later cause the cam surface 125, in its clockwise direction of rotation, finally to come against the contact strip 117 to cause the contacts 113 and 115 to be broken.

Thus, in the manner explained in the co-pending application, provision for rotation of the motor in either of two directions is made by way of the control through the switch elements, and the limit of motion is determined by the relative positions of cam surface 125 and contact strips 117 and 127.

In order that the optical image directed through the lens element 11, in the direction shown by the arrow in Fig. 3, into the camera tube 15 shall be accurately focused upon the light sensitive mosaic 13, provision is made by way of the support pins 129 and 131 for adjustably positioning and supporting the support frame 83 for the lens elements and the shutter control upon the housing 133 wherein the camera tube 15 and its suitable controls is supported, along with its amplifier, and the phototube 33 and its amplifier (not shown). To this end, there is supported in a suitable support plate element 135 contained within the housing, two support rods 129 and 131 above explained. The rods or spindles are suitably secured into the support plate 135 by means of the conventionally represented set screws 137 and 139, or may be fastened therein in any other suitable manner.

It will be noted that the support plate 135 is positioned internally of the housing element 133 in such a way that the shutter support element 83 is positioned by the support rods 129 and 131 within the overhang portion 141 of the housing element itself whereby convenient adjustment of the optical system may be provided.

The support rod or spindle 129 is threaded at one end 143 with the threads fitting within the hollow threaded portion of a sleeve 145 which is also threaded. The sleeve 145 has its outer end 147 of substantially square configuration and is positioned so as to fit within and be rigidly positioned relative to an adjusting knob or handle 149. The sleeve 145 has, at its outer end, an enlarged flanged portion 151 which has teeth 153 extending about the periphery thereof. This flanged element is positioned within the internal portion of the projecting tubular end 155 of the handle or knob member 149 and, by virtue of the spring member 157, the handle or knob member 149 is pushed outwardly from the enlarged portion 151 of the sleeve, with the engagement between the two elements being maintained by virtue of the ring-like washer member 159 which fits over the shoulder 161 on the knob and is thus arranged to secure the knob to the squared end 147 of the sleeve 145. Accordingly, with the sleeve 145 threaded into the threaded end of the support rod or spindle 129 and the spring 157 arranged to bear against the inner shoulder 163 of the knob 149 and also to bear against the enlarged portion 151 of the sleeve, it is apparent that the knob 149 and its tubular end 155 will be pressed to the left from the position shown, looking at Fig. 3. In such position, the detent member 165, which is held within the support frame 83, is pressed against the teeth 153 in the enlarged portion 151 of the sleeve 145 so as to prevent rotation of the knob and thus prevent any adjustment of the support member 83 relative to the support 135 and thus the camera tube 15. The detent 165 is pressed outwardly toward the teeth members 153 by virtue of the compression spring 167 which is suitably held within the support member 83 so that in the absence of any provision for depressing the detent 165, the position of the knob 149 and the sleeve 145 relative to the threaded end 143 of the support rod of the spindle 129 is fixedly established. However, when it is desired to provide for an adjustment of the focus of any image passing through the lens element 11 toward the mosaic 13 of the camera tube 15, the knob 149 is pressed inwardly toward the support element 83 against the pressure of the spring member 157. In this inwardly pressed position, that is, a motion of the knob toward the camera tube 15, the shoulder 169 is adapted to engage one edge of the detent 165 and to depress it against the force of the spring 167 so as to provide for disengagement of the detent and the teeth 153. In this position the knob may be turned and, by virtue of the squared end 147 of the sleeve 145, rotation of the knob will cause the sleeve to move and carry the support member 83 inwardly or outwardly relative to the support 135 by virtue of the threading on the spindle 129 while sliding motion is obtained by the support of the member 83 on the unthreaded spindle 131. As soon as the proper focusing for the conditions at hand has been obtained, the knob may again be released and the spring 167 will then force the detent 165 into the teeth 153 on the enlarged portion 151 of the sleeve to prevent further rotation or focusing adjustment, so that for all intents and purposes the adjustment will remain fixed.

In the light of what has been above described, it is apparent that many and various modifications may be made in this invention without departing in any way from the spirit or scope of what is herein set forth and defined particularly by the appended claims. In this connection it is to be particularly understood that the electrical circuits for controlling the production of the cathode ray beam within the scanning or camera tube 15 are not shown, nor yet are the suitable forms of energy supplies for energizing the deflection coils conventionally represented at 21, and, likewise, the general form of the amplifier 25 and its output has been represented in purely schematic manner.

Having described the invention, what is claimed is:

1. An optical shutter system for controlling and determining the quantity of light directed along two adjacent optical paths which comprises a pair of shutter elements each having opposite end portions curved and arranged to overlap each of the optical paths, a centrally located pivot point for each of the said shutter elements, an oscillatory driving arm means for causing each of the shutter elements to rotate simultaneously about the pivot means so that one shutter element rotates clockwise and the other shutter element rotates counterclockwise so as to cause the outer extremities of the shutter elements to overlap each optical path in one extreme position of motion and to cause the said shutter elements to separate in the other extreme position of motion to uncover completely each of the said optical paths, said oscillatory driving arm means for providing substantially like variance of the opening and closing of the shutters relative to each optical path to determine the light quantity directed along each optical path, a drive means and a friction clutch unit for driving the said oscillatory means in each of its direction of motion and a limiting means for controlling and limiting the oscillatory motion of the oscillating means in each direction of oscillation.

2. An optical shutter system for controlling and determining the quantity of light directed along two adjacent optical paths which comprises a pair of shutter vane elements each having opposite end portions curved and arranged to overlap each of the optical paths, a substantially centrally located pivot point for each of the said shutter elements, an oscillatory drive means for causing each of the shutter elements to rotate simultaneously about the pivot means so that one shutter element rotates clockwise and the other shutter element rotates counterclockwise so as to cause the outer extremities of the shutter elements to overlap each optical path in one extreme position of motion and to cause the said shutter elements to separate in the other extreme position of motion to uncover substantially completely each of the said optical paths, said oscillatory drive means also providing substantially like variance of the opening and closing of the shutters relative to each optical path to determine the light quantity directed along each optical path, a driving motor for rotating the oscillatory drive means, a friction clutch unit connected between the driving motor and the oscillatory drive means for transferring a driving force to the said oscillatory means in each of its directions of motion, a limiting means for controlling and limiting the oscillatory motion of the oscillating means in each direction of oscillation and switching means operative in accordance with the angular position of the oscillatory arm to disconnect the drive motor upon attainment of a pre-established point of limit of motion in each direction of oscillation.

3. An optical shutter system for regulating the quantity of light passing along each of two independent optical paths which comprises a pair of shutter vanes positioned in substantially partially overlapping relationship with respect to each other, a support means for locating and supporting each of said shutter vanes to permit shutter vane rotation about the support of each of the vanes, an oscillatory shutter vane driving arm having one end thereof pivotally supported at a point eccentric to the vane support point and having its other end extend to a point beyond the shutter vane support point so that the arm length exceeds the distance between its point of pivotal support and the point about which the shutter vanes are positioned to rotate, a driving connection for one of the shutter vanes to a point on the oscillatory arm intermediate the vane support means and the oscillatory arm support pivot point, a driving connection between the other shutter vane and the oscillatory arm at a point on the oscillatory arm region extending beyond the vane support means so that oscillation of the said driving arm about its pivot support point would cause one of the ..hutter vanes to rotate clockwise while the other shutter vane is caused simultaneously to rotate counterclockwise, and vice versa, in accordance with the clockwise or counterclockwise oscillation of the said oscillatory arm, a driving means for the oscillatory arm, a friction clutch for driving the said oscillatory arm from the drive means in clockwise or counterclockwise direction depending upon the direction of drive from the said driving means, and means for limiting the oscillatory motion of the oscillatory driving arm thereby to control and limit the amount of clockwise and counterclockwise rotation of the shutter vanes.

4. An optical shutter system for regulating the quantity of light passing along each of two independent optical paths which comprises a pair of shutter vanes positioned in substantially partially overlapping relationship with respect to each other, a support means for locating and supporting each of said shutter vanes to permit shutter vane rotation about the support of each of the vanes, an oscillatory shutter vane driving arm having one end thereof pivotally supported at a point eccentric to the vane support point and having its other end extend to a point beyond the shutter vane support point so that the arm length exceeds the distance between its point of pivotal support and the point about which the shutter vanes are positioned to rotate, one of said vanes having a slotted portion through which the connection is made between the other said vanes and the oscillatory arm at the point on said arm intermediate the support point about which the vanes rotate and the pivot point of the oscillatory arm so that the opposite rotational direction is imparted to each of the vanes with oscillation of the arm about its support point, a driving connection for one of the shutter vanes to a point on the oscillatory arm intermediate the vane support means and the oscillatory arm support pivot point, a driving connection between the other shutter vane and the oscillatory arm at a point on the oscillatory arm region extending beyond the vane support means so that oscillation of the said driving arm about its pivot support point would cause one of the shutter vanes to rotate clockwise while the other shutter vane is caused simultaneously to rotate counterclockwise, and vice versa, in accordance with the clockwise or counterclockwise oscillation of the said oscillatory arm, a driving means for the oscillatory arm, a friction clutch for driving the said oscillatory arm from the drive means in clockwise or counterclockwise direction depending upon the direction of drive from the said driving means, and means for limiting the oscillatory motion of the oscillatory driving arm thereby to control and limit the amount of clockwise and counterclockwise rotation of the shutter vanes.

EMILE C. GUEDON.

REFERENCES CITED

The following references are of record in the file of this patent:

UNITED STATES PATENTS

| Number | Name | Date |
|---|---|---|
| 1,372,645 | Cooper | Mar. 22, 1921 |
| 1,799,879 | Wittel | Apr. 7, 1931 |
| 2,172,340 | Mihalyi | Sept. 5, 1939 |
| 2,270,311 | Kende et al. | Jan. 20, 1942 |
| 2,214,228 | Eppensteiner | Sept. 10, 1940 |
| 2,339,810 | Richards | Jan. 25, 1944 |
| 2,307,479 | Annick | Jan. 5, 1943 |
| 363,547 | Schneider | May 24, 1887 |
| 2,149,743 | Newick | Mar. 7, 1939 |
| 2,135,506 | Hansch et al. | Nov. 8, 1938 |
| 607,242 | Huff, et al. | July 12, 1898 |
| 520,696 | McCollom | May 29, 1894 |

FOREIGN PATENTS

| Number | Country | Date |
|---|---|---|
| 503,901 | Great Britain | Apr. 17, 1939 |
| 491,410 | Great Britain | Sept. 1, 1938 |